(12) United States Patent
Denton

(10) Patent No.: US 9,983,070 B2
(45) Date of Patent: May 29, 2018

(54) TEMPERATURE SENSOR VALIDATION

(71) Applicant: Trane International Inc., Piscataway, NJ (US)

(72) Inventor: Darryl Elliott Denton, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 187 days.

(21) Appl. No.: 14/991,565

(22) Filed: Jan. 8, 2016

(65) Prior Publication Data

US 2016/0216026 A1    Jul. 28, 2016

Related U.S. Application Data

(60) Provisional application No. 62/106,558, filed on Jan. 22, 2015.

(51) Int. Cl.
*G01K 15/00* (2006.01)
*F24F 11/00* (2018.01)

(52) U.S. Cl.
CPC .......... *G01K 15/007* (2013.01); *G01K 15/00* (2013.01); *F24F 11/0012* (2013.01); *F24F 2011/0052* (2013.01)

(58) Field of Classification Search
CPC ............... G01K 15/007; F24F 11/0012; F24F 2011/0013; F24F 2011/0052; F24F 2011/0087; F24F 2011/0089; F24F 2011/0091
See application file for complete search history.

(56) References Cited

U.S. PATENT DOCUMENTS

| | | | | |
|---|---|---|---|---|
| 5,440,895 A | * | 8/1995 | Bahel | F24F 11/0009 62/211 |
| 2004/0172954 A1 | * | 9/2004 | Hanson | F24F 11/0086 62/125 |

* cited by examiner

*Primary Examiner* — Jonathan Bradford
(74) *Attorney, Agent, or Firm* — Conley Rose, P.C.; J. Robert Brown, Jr.

(57) ABSTRACT

Systems and methods are disclosed that include providing a heating, ventilation, and/or air conditioning (HVAC) system with a temperature sensor validation system that measures the ambient outdoor temperature using a first temperature sensor and the refrigeration coil temperature using a second temperature sensor at a plurality of time intervals following a refrigeration coil defrost procedure. A system controller may implement an algorithm to determine if the first temperature sensor and the second temperature sensor are reliable by comparing the temperature readings from the first temperature sensor and the second temperature sensor taken at the plurality of time intervals following the defrost procedure. The system controller may also implement so-called limp along modes if any temperature sensor is determined unreliable.

20 Claims, 4 Drawing Sheets

TEMPERATURE SENSOR VALIDATION

CROSS-REFERENCE TO RELATED APPLICATIONS

The present application claims priority under 35 U.S.C. 119(e) to U.S. Provisional Patent Application No. 62/106,558 filed on Jan. 22, 2015 by Darryl E. Denton, and entitled "Temperature Sensor Validation," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems may generally be used in residential and/or commercial areas for heating and/or cooling to create comfortable temperatures inside those areas. Some HVAC systems may be heat pump systems. Heat pump systems may generally be capable of cooling a comfort zone by operating in a cooling mode for transferring heat from a comfort zone to an ambient zone using a refrigeration cycle and also generally capable of reversing the direction of refrigerant flow through the components of the HVAC system so that heat is transferred from the ambient zone to the comfort zone, thereby heating the comfort zone. When a heat pump system is operated in cold ambient temperatures, condensation may often form on an outdoor condenser coil and freeze. Accordingly, it may be necessary to periodically defrost the outdoor condenser coil. Current methods used to defrost the outdoor condenser coil typically involve reversing the operation of the heat pump system to operate in a cooling mode so that heated refrigerant is delivered to the condenser coil to defrost it. Accordingly, because heat pump systems rely heavily on the transfer of heat between components of the heat pump system and/or ambient air for safe and efficient operation, temperature sensors may be used to monitor the ambient outdoor temperature and/or the outdoor condenser coil temperature for a heat pump system that frequently operates in cold weather climates.

SUMMARY

In some embodiments of the disclosure, an HVAC system is disclosed as comprising: an outdoor unit comprising an outdoor heat exchanger; a first temperature sensor configured to measure an outdoor ambient temperature at each of a first interval, a second interval, and a third interval following a defrost procedure; a second temperature sensor configured to measure a coil temperature of the outdoor heat exchanger at each of the first time interval, the second time interval, and the third time interval following the defrost procedure; and a controller configured to determine if either of the first temperature sensor and the second temperature sensor are unreliable.

In other embodiments of the disclosure, a method of validating temperature sensors in an HVAC system is disclosed as comprising: measuring an ambient outdoor temperature with a first temperature sensor and a refrigeration coil temperature with a second temperature sensor at each of a first interval, a second interval, and a third interval following a defrost procedure; and determining if either of the first sensor and the second sensor are unreliable.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
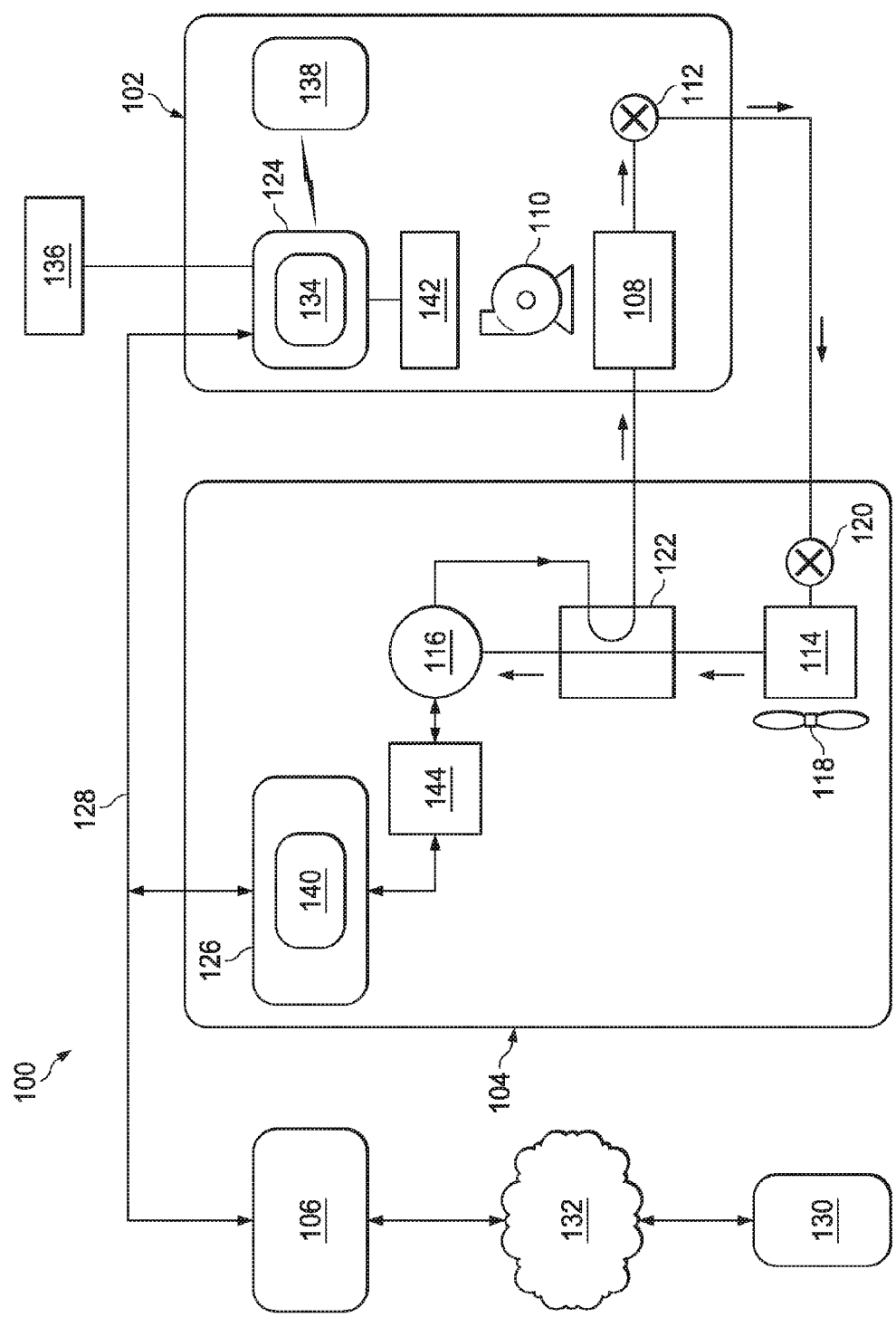
FIG. 1 is a schematic diagram of an HVAC system according to an embodiment of the disclosure.

Referring now to FIG. 1, a schematic diagram of an HVAC system 100 is shown according to an embodiment of the disclosure. Most generally, HVAC system 100 comprises a heat pump system that may be selectively operated to implement one or more substantially closed thermodynamic refrigeration cycles to provide a cooling functionality (hereinafter "cooling mode") and/or a heating functionality (hereinafter "heating mode"). The HVAC system 100, configured as a heat pump system, generally comprises an indoor unit 102, an outdoor unit 104, and a system controller 106 that may generally control operation of the indoor unit 102 and/or the outdoor unit 104.

Indoor unit 102 generally comprises an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, indoor heat exchanger 108 may comprise a plate-fin heat exchanger. However, in other embodiments, indoor heat exchanger 108 may comprise a spine fin heat exchanger, a microchannel heat exchanger, or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of a climate controlled structure. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In alternative embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, however, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flowpath of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104 and/or other components of the HVAC system 100. In some embodiments, the system controller 106 may be configured to control operation of the indoor unit 102 and/or the outdoor unit 104. In some embodiments, the system controller 106 may be configured to monitor and/or communicate with a plurality of temperature sensors associated with components of the indoor unit 102, the outdoor unit 104, and/or the ambient outdoor temperature. Additionally, in some embodiments, the system controller 106 may comprise a temperature sensor and/or may further be configured to control heating and/or cooling of zones associated with the HVAC system 100. In other embodiments, however, the system controller 106 may be configured as a thermostat for controlling the supply of conditioned air to zones associated with the HVAC system 100.

The system controller 106 may also generally comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, however, the system controller 106 may not comprise a display and may derive all information from inputs from remote sensors and remote configuration tools.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

The HVAC system 100 is shown configured for operating in a so-called heating mode in which heat may generally be absorbed by refrigerant at the outdoor heat exchanger 114 and rejected from the refrigerant at the indoor heat exchanger 108. Starting at the compressor 116, the compressor 116 may be operated to compress refrigerant and pump the relatively high temperature and high pressure compressed refrigerant through the reversing valve 122 and to the indoor heat exchanger 108, where the refrigerant may transfer heat to an airflow that is passed through and/or into contact with the indoor heat exchanger 108 by the indoor fan 110. After exiting the indoor heat exchanger 108, the refrigerant may flow through and/or bypass the indoor metering device 112, such that refrigerant flow is not substantially restricted by the indoor metering device 112. Refrigerant generally exits the indoor metering device 112 and flows to the outdoor metering device 120, which may meter the flow of refrigerant through the outdoor metering device 120, such that the refrigerant downstream of the outdoor metering device 120 is at a lower pressure than the refrigerant upstream of the outdoor metering device 120. From the outdoor metering device 120, the refrigerant may enter the outdoor heat exchanger 114. As the refrigerant is passed through the outdoor heat exchanger 114, heat may be transferred to the refrigerant from an airflow that is passed through and/or into contact with the outdoor heat exchanger 114 by the outdoor fan 118. Refrigerant leaving the outdoor heat exchanger 114 may flow to the reversing valve 122, where the reversing valve 122 may be selectively configured to divert the refrigerant back to the compressor 116, where the refrigeration cycle may begin again.

Alternatively, to operate the HVAC system 100 in a so-called cooling mode, most generally, the roles of the indoor heat exchanger 108 and the outdoor heat exchanger 114 are reversed as compared to their operation in the above-described heating mode. For example, the reversing valve 122 may be controlled to alter the flow path of the refrigerant from the compressor 116 to outdoor heat exchanger 114 first and then to the indoor heat exchanger 108, the indoor metering device 112 may be enabled, and the outdoor metering device 120 may be disabled and/or bypassed. In cooling mode, heat may generally be absorbed by refrigerant at the indoor heat exchanger 108 and rejected by the refrigerant at the outdoor heat exchanger 114. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. Additionally, as refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. Furthermore, the HVAC system 100 may be operated in the cooling mode in colder climates to transfer heat from the refrigerant to the outdoor heat exchanger 114 in order to melt frozen condensate that has formed on the outer surfaces of the heat exchanger 114. This procedure may be referred to as a defrost procedure.

Figure 2:
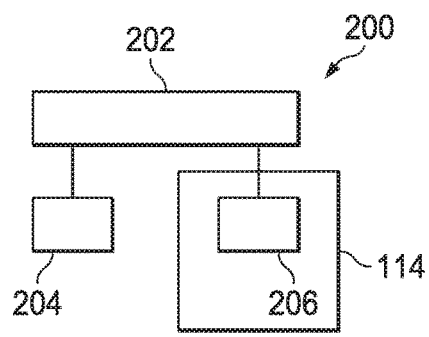
FIG. 2 is a schematic diagram of a temperature sensor validation system according to an embodiment of the disclosure.

Referring now to FIG. 2, a schematic diagram of a temperature sensor validation (TSV) system 200 is shown according to an embodiment of the disclosure. The TSV system 200 comprises a controller 202, a first temperature sensor 204, and a second temperature sensor 206. In some embodiments, the controller 202 may generally comprise the system controller 106 of FIG. 1 and be configured to communicate with the outdoor controller 126 and/or monitor the first temperature sensor 204 and the second temperature sensor 206 via the outdoor controller 126. In some embodiments, the controller 202 may comprise system controller 106 of FIG. 1 and be directly coupled to each of the first temperature sensor 204 and the second temperature sensor 206. However, in alternative embodiments, the controller 202 may comprise the outdoor controller 126 of FIG. 1 and be configured to communicate with the system controller 106 of FIG. 1. The controller 202 may generally be configured to monitor, measure, and/or receive temperature value inputs via each of the first temperature sensor 204 and the second temperature sensor 206.

The first temperature sensor 204 is coupled to the controller 202 and configured to monitor and/or measure the ambient outdoor temperature. The first temperature sensor 204 may also be configured to communicate the measured ambient outdoor temperature to the controller 202. In some embodiments, the first temperature sensor 204 may be carried by the outdoor unit 104 of FIG. 1. However, in alternative embodiments, the first temperature sensor 204 may be remotely mounted from the outdoor unit 104. The second temperature sensor 206 is also coupled to the controller 202. However, the second temperature sensor 206 is configured to monitor and/or measure the refrigeration coil temperature of the outdoor heat exchanger 114 of FIG. 1. The second temperature sensor 206 may also be configured to communicate the measured refrigeration coil temperature to the controller 202.

In operation, the TSV system 200 may be configured to ensure that the temperature sensors 204, 206 are functioning correctly. After a defrost procedure, the TSV system 200 may generally measure the ambient outdoor temperature via the first temperature sensor 204 and the refrigeration coil temperature of the outdoor heat exchanger 114 via the second temperature sensor 206 at three time periods after the defrost procedure has terminated. More specifically, the first temperature sensor 204 and the second temperature sensor 206 may measure the ambient outdoor temperature and the refrigeration coil temperature, respectively, at a first time where the refrigeration coil temperature is still high from the previous defrost procedure, at a second time when the refrigeration coil temperature has reached an equilibrium temperature and/or steady state temperature, and at a third time before substantial frost buildup has accumulated on the refrigeration coil. In other words, the second time may be when the refrigeration coil has stopped declining, and the third time may be prior to deterioration of the performance of the refrigeration coil when frost has substantially accumulated. Thus, the second time and the third time may bracket a so-called clear coil equilibrium operation of the refrigeration coil when the refrigeration coil temperature remains substantially constant.

For example, the first temperature sensor 204 and the second temperature sensor 206 may measure the ambient outdoor temperature and the refrigeration coil temperature, respectively, at about within 1 minute after the defrost procedure, at about 12 minutes after the defrost procedure, and at about 15 minutes after the defrost procedure. However, in some embodiments, the temperature readings may be made at any three time periods selected between the termination of the defrost procedure and about 15 minutes after the defrost procedure. After each temperature reading, the temperature readings may be communicated to the controller 202. The controller 202 may implement an algorithm using the readings of the temperature sensors 204, 206 to determine if the temperature sensors 204, 206 are functioning correctly.

Figure 3:
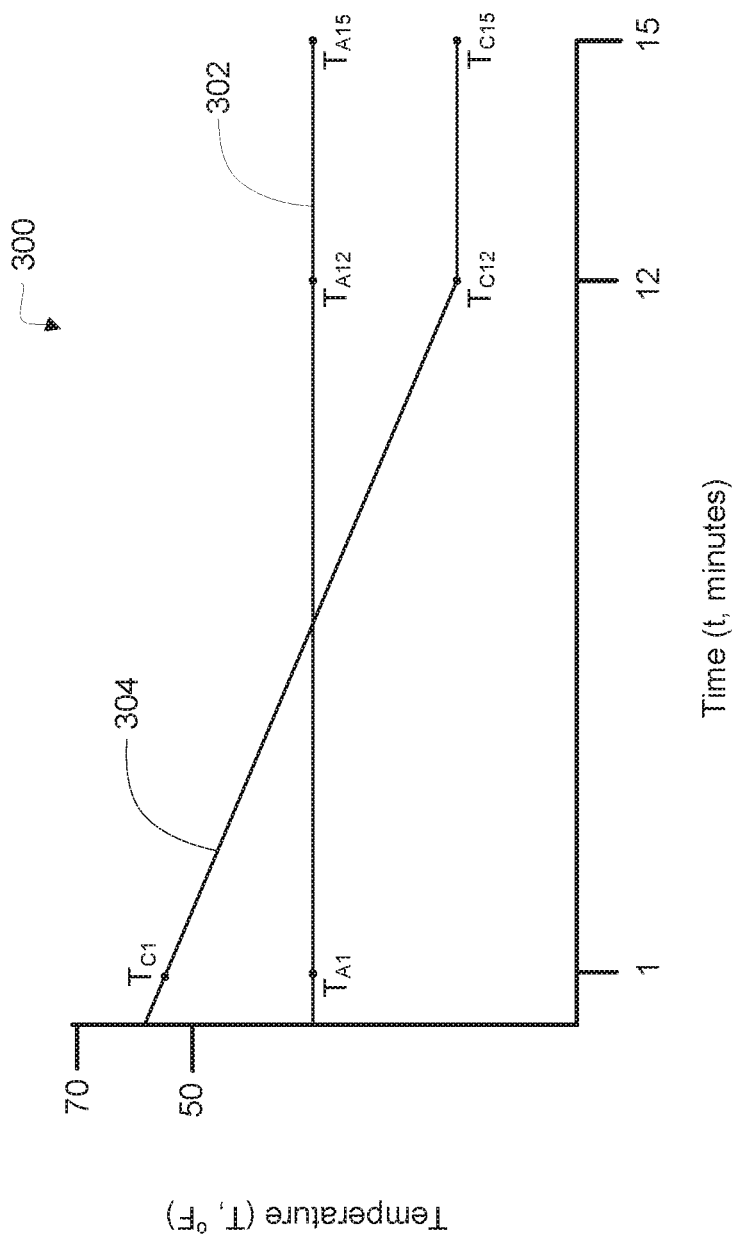
FIG. 3 is a temperature versus time chart of an ambient outdoor temperature curve and a coil temperature curve after termination of a defrost procedure according to an embodiment of the disclosure.

Referring now to FIG. 3, a temperature versus time chart 300 of an ambient outdoor temperature curve 302 and a coil temperature curve 304 is shown after termination of a defrost procedure according to an embodiment of the disclosure. The chart 300 illustrates the trend of the ambient outdoor temperature (measured in degrees Fahrenheit) with respect to elapsed time (measured in minutes) after the termination of a defrost procedure on the ambient outdoor temperature curve 302. The ambient outdoor temperature curve 302 includes three ambient outdoor temperature measurements: TA1 is the ambient outdoor temperature measured at about within 1 minute after the defrost procedure; TA12 is the ambient outdoor temperature measured at about 12 minutes after the defrost procedure; and TA15 is the ambient outdoor temperature measured at about 15 minutes after the defrost procedure. As shown by the ambient outdoor temperature curve 302, the ambient outdoor temperature remains substantially constant from the termination of the defrost procedure to about 15 minutes after termination of the defrost procedure.

The chart 300 also illustrates the trend of the refrigeration coil temperature (measured in degrees Fahrenheit) with respect to elapsed time (measured in minutes) after the termination of a defrost procedure on the coil temperature curve 304. The coil temperature curve 304 includes three coil temperature measurements: TC1 is the coil temperature measured at about within 1 minute after the defrost procedure; TC12 is the coil temperature measured at about 12 minutes after the defrost procedure; and TC15 is the coil temperature measured at about 15 minutes after the defrost procedure. After a defrost procedure, the refrigeration coil temperature may be around 47 degrees Fahrenheit. The refrigeration coil temperature will thereafter decrease until the coil temperature reaches a steady state and/or equilibrium temperature, where frost begins to form on the refrigeration coil. In some embodiments, the equilibrium point may occur at about 12 minutes after the defrost procedure is terminated. Thereafter, the temperature of the refrigeration coil may remain substantially constant until a new defrost procedure is initiated.

Referring now to FIGS. 2 and 3, the controller 202 may implement an algorithm using the temperature readings (TA1, TC1; TA12, TC12; TA15, TC15) of the temperature sensors 204, 206 to determine if the temperature sensors 204, 206 are functioning correctly. It will be appreciated that the first temperature sensor measures the ambient outdoor temperature that is shown as ambient outdoor temperature curve 302, and the second temperature sensor 206 measures the refrigeration coil temperature that is shown as coil temperature curve 304. After the termination of a defrost procedure and within the first minute, the controller 202 may receive and/or read the temperature of the ambient outdoor temperature via the first temperature sensor 204 and the refrigeration coil temperature via the second temperature sensor 206, TA1 and TC1, respectively. Most generally, the refrigeration coil temperature, TC1, will be higher than the ambient outdoor temperature, TA1, within the first minute after a defrost procedure. More specifically, the coil temperature, TC1, will be about 47 degrees Fahrenheit or higher.

About 12 minutes after the termination of the defrost procedure, the controller 202 may receive and/or read the temperature of the ambient outdoor temperature via the first temperature sensor 204 and the refrigeration coil temperature via the second temperature sensor 206, TA12 and TC12, respectively. At this point, the coil temperature will have dropped, and the coil temperature, TC12, should be lower than the ambient outdoor temperature, TA12. After an additional 3 minutes, about 15 minutes after the termination of the defrost procedure, the controller 202 may receive and/or read the temperature of the ambient outdoor temperature via the first temperature sensor 204 and the refrigeration coil temperature via the second temperature sensor 206, TA15 and TC15, respectively. At this point, the coil temperature should reach a steady state and/or equilibrium temperature, where frost begins to form on the refrigeration coil. As such TC12 may be substantially similar to TC15.

Accordingly, the controller 202 may implement the algorithm using the temperature readings (TA1, TC1; TA12, TC12; TA15, TC15) of the temperature sensors 204, 206 to determine if the temperature sensors 204, 206 are functioning correctly. To determine if the temperature sensors 204, 206 are functioning properly, the algorithm may look for a specific temperature signature from the readings of the temperature sensors. Further, it will be appreciated that each of the steps and/or checks implemented by algorithm to determine if the correct temperature signature is present may be completed substantially simultaneously as the readings are received by the controller 202, and/or may alternatively be completed after the six temperature readings are received by the controller 202.

To determine if the second temperature sensor 206 is working correctly, the controller 202 may implement an algorithm and determine if the coil temperature readings (TC1, TC12, and TC15) meet a specific coil temperature signature. As stated, after a defrost procedure, the coil temperature will be about 47 degrees Fahrenheit or higher, as shown by TC1. After about 12 minutes after a defrost procedure, as shown by TC12, the coil temperature should have reached a steady state value. Then after an additional 3 minutes, as shown by TC15, the coil temperature should not have changed much from the 12 minute coil temperature reading, TC12. As such, the controller 202 determines whether TC12 is substantially equal to TC15. If TC12 is substantially equal to TC15, then the second temperature sensor 206 is determined to be reliable. However, if TC12 is not substantially equal to TC15, then the second temperature sensor 206 is determined to be compromised. In alternative embodiments, the controller 202 may determine if TC12 is within a specified tolerance of TC15. For example, if TC12 is within 3 degrees Fahrenheit of TC15, then the second temperature sensor 206 is determined to be reliable. However, in such alternative embodiments, if TC12 is not within the specified tolerance of TC15, then the second temperature sensor 206 is determined to be compromised. Additionally, in some embodiments, the controller 202 may also determine if TC1 is greater than TC12. In such embodiments, the second temperature sensor 206 is determined to be reliable if TC1 is greater than TC12. Otherwise, if TC12 is greater than or equal to TC1, the second temperature sensor 206 is determined to be compromised.

If the second temperature sensor 206 is determined to be compromised, then the controller 202 may implement a so-called Coil Sensor Limp Along Mode (LAL2 mode). When the second temperature sensor 206 is compromised, the coil temperature cannot be accurately determined. Thus, the controller 202 cannot determine when to terminate a defrost procedure accurately. Accordingly, in the LAL2 mode, the controller 202 will implement about a 5 minute defrost procedure about every 1 hour interval. However, in other embodiments, the defrost procedure may be about 6 minutes, about 7 minutes, about 8 minutes, about 9 minutes, about 10 minutes and/or any other time at an interval of about 45 minutes, about 75 minutes, and/or about 90 minutes. After each defrost procedure in the LAL2 mode, the controller 202 may again attempt to receive and/or read the coil temperature from the second temperature sensor 206 and the ambient outdoor temperature from the first temperature sensor 204 to again implement the algorithm to check for the specific temperature signatures to determine if the temperature sensors 204, 206 are working correctly. If the sensors 204, 206 are working correctly, the controller 202 may exit the LAL2 mode.

To determine if the first temperature sensor 204 is working correctly, the controller 202 may implement an algorithm and determine if the ambient outdoor temperature readings (TA1, TA12, and TA15) meet a specific ambient outdoor temperature signature. After the termination of the defrost procedure, the refrigeration coil temperature, TC1, will be higher than the ambient outdoor temperature, TA1. Accordingly, the controller 202 will determine if TC1 is greater than TA1. At about 12 minutes after the termination of the defrost procedure, the coil temperature will have dropped, and the coil temperature, TC12, should be lower than the ambient outdoor temperature, TA12. Accordingly, the controller 202 will determine if TC12 is less than TA12. Because the coil temperature should reach a steady state at about 12 minutes after a defrost procedure, TC12 should be substantially equal to TC15. Therefore the controller 202 may also determine if TC15 is less than TA15. Over a 15 minute time period following a defrost procedure, the ambient outdoor temperature should remain substantially constant. Accordingly, TA1, TA12, and TA15 should be substantially equal. The controller 202 determines if TA1, TA12, and TA15 are substantially equally. In alternative embodiments, the controller 202 may determine if TA1, TA12, and TA15 are within a specified tolerance. For example, in such alternative embodiments, the algorithm may determine if TA1, TA12, and TA15 are within 3 degrees Fahrenheit of each other. Accordingly, if TC1>TA1, TC12<TA12, TC15<TA15, and TA1, TA12, and TA15 are substantially equal, then the first temperature sensor 204 is determined to be reliable. However, if any of the above criteria are false and/or not satisfied, then the first temperature sensor 204 is determined to be compromised and/or unreliable.

If the first temperature sensor 204 is determined to be compromised, then the controller 202 may implement a so-called Ambient Sensor Limp Along Mode (LAL1 mode). The LAL1 mode is an adaptive defrost procedure mode. In the LAL1 mode, the controller 202 will implement a first defrost procedure about 60 minutes after the termination of the defrost procedure in which the first temperature sensor 204 was determined to be unreliable. The first defrost procedure will terminate when the coil temperature as determined by the second temperature sensor 206 reaches the specified defrost temperature. In some embodiments, the specified defrost temperature will be about 47 degrees Fahrenheit. However, in other embodiments, the specified defrost temperature may be any temperature at which the refrigeration coil 114 is defrosted. The target defrost time is about 5 minutes. If the defrost takes longer than 5 minutes, then the controller 202 will decrease the interval until the next subsequent defrost. In some embodiments, the decrease will be about 10 minutes (i.e. from 60 minutes between defrost procedures to 50 minutes between defrost procedures). However, if the defrost takes less than 5 minutes, then the controller 202 will increase the interval until the next subsequent defrost. In some embodiments, the increase will be about 10 minutes (i.e. from 60 minutes between defrost procedures to 70 minutes between defrost procedures). However, in other embodiments, the increase and/or decrease in interval may be at least about 5 minutes up to at least about 15 minutes.

After each defrost procedure in the LAL1 mode, the controller 202 may again attempt to receive and/or read the coil temperature from the second temperature sensor 206 and the ambient outdoor temperature from the first temperature sensor 204 to again implement the algorithm to check for the specific temperature signatures to determine if the temperature sensors 204, 206 are working correctly. If the sensors 204, 206 are working correctly, the controller 202 may exit the LAL1 mode. However, if the first temperature sensor 204 is determined to still be unreliable, the controller 202 will again increase or decrease the interval between defrost procedures as previously described. This may continue until the defrost procedure time is about 5 minutes. However, in no instance will the controller 202 exceed a minimum interval of 30 minutes and a maximum interval of 120 minutes.

Figure 4:
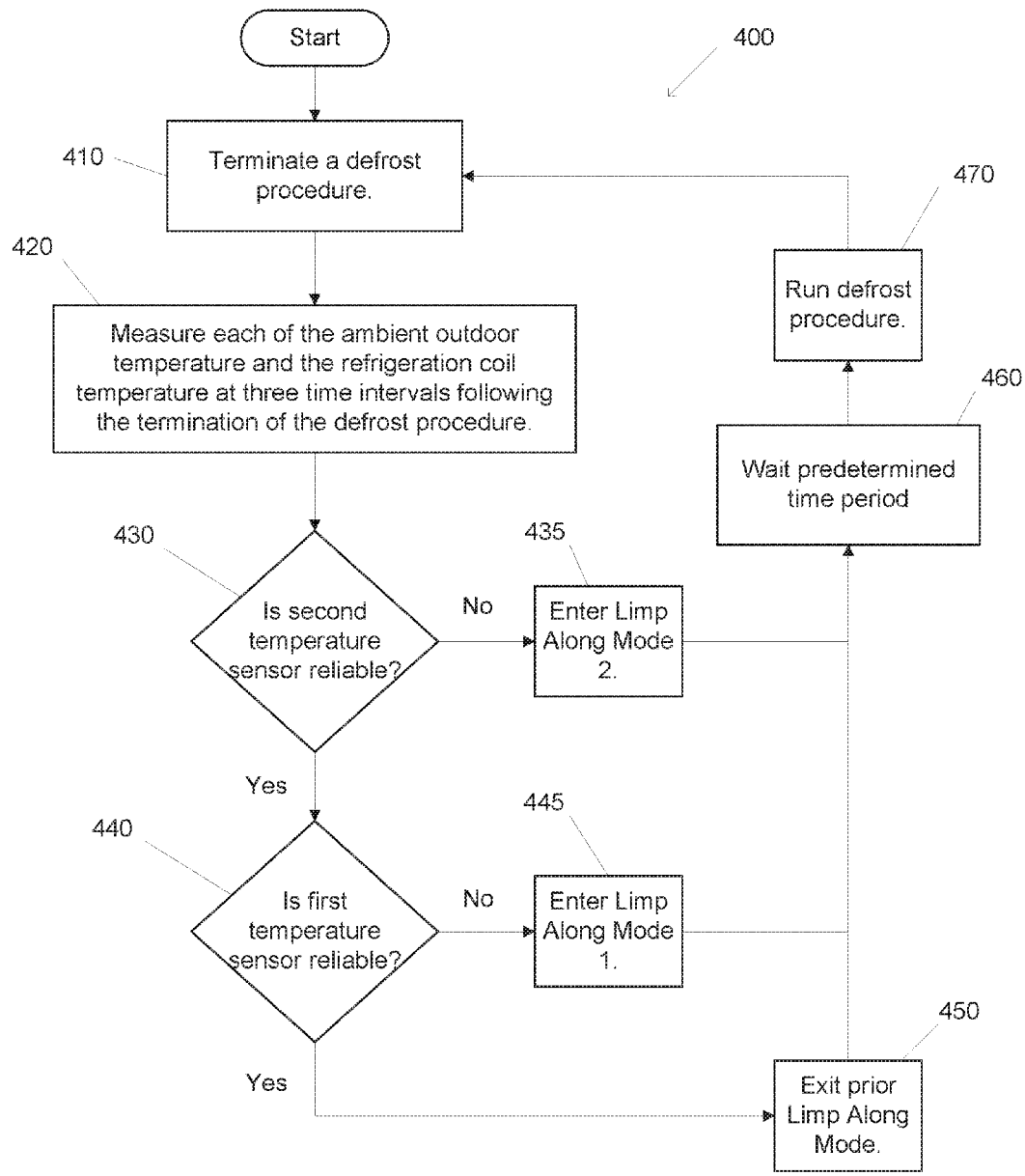
FIG. 4 is a flowchart of a method of validating temperature sensors according to an embodiment of the disclosure.

Referring now to FIG. 4, a flowchart of a method 400 of validating temperature sensors is shown according to an embodiment of the disclosure. The method 400 may begin at block 410 by terminating a defrost procedure. The method 400 may continue at block 420 by measuring the ambient outdoor temperature and the refrigeration coil temperature at three time intervals following the termination of the defrost procedure. In some embodiments, the ambient outdoor temperature is measured with a first temperature sensor, and the coil temperature is measured with a second temperature sensor. In some embodiments, the ambient outdoor temperature and the coil temperature will be measured within the first minute after termination of the defrost procedure, at about 12 minutes after the termination of the defrost procedure, and at about 15 minutes after the termination of the defrost procedure. The method 400 may continue at block 430 by determining if the second temperature sensor is reliable. If TC12 is substantially equal to TC15, then the second temperature sensor is determined to be reliable. If the second temperature sensor is not reliable then the method 400 may proceed to block 435 and enter the LAL2 mode. After entering the LAL2 mode, the method 400 may continue to block 460 and wait a predetermined time period before the next defrost procedure, which is run at block 470 after the predetermined time period has elapsed. If the second temperature sensor is reliable then the method 400 may proceed to block 440 and determine if the first temperature sensor is reliable. If TC1>TA1, TC12<TA12, TC15<TA15, and TA1, TA12, and TA15 are substantially equal, then the first temperature sensor is determined to be reliable. If the first temperature sensor is not reliable then the method 400 may proceed to block 445 and enter the LAL1 mode. After entering the LAL1 mode, the method 400 may continue to block 460 and wait a predetermined time period before the next defrost procedure, which is run at block 470 after the predetermined time period has elapsed If the second temperature sensor is reliable then the method 400 may proceed to block 450 and exit any prior LAL2 or LAL1 mode. The method 400 may then continue at block 460 by waiting a predetermined time period before the next defrost procedure, which is run at block 470 after the predetermined time period has elapsed. After running a defrost procedure at block 470, the method may then repeat and/or restart at block 410 by terminating the defrost procedure.

Figure 5:
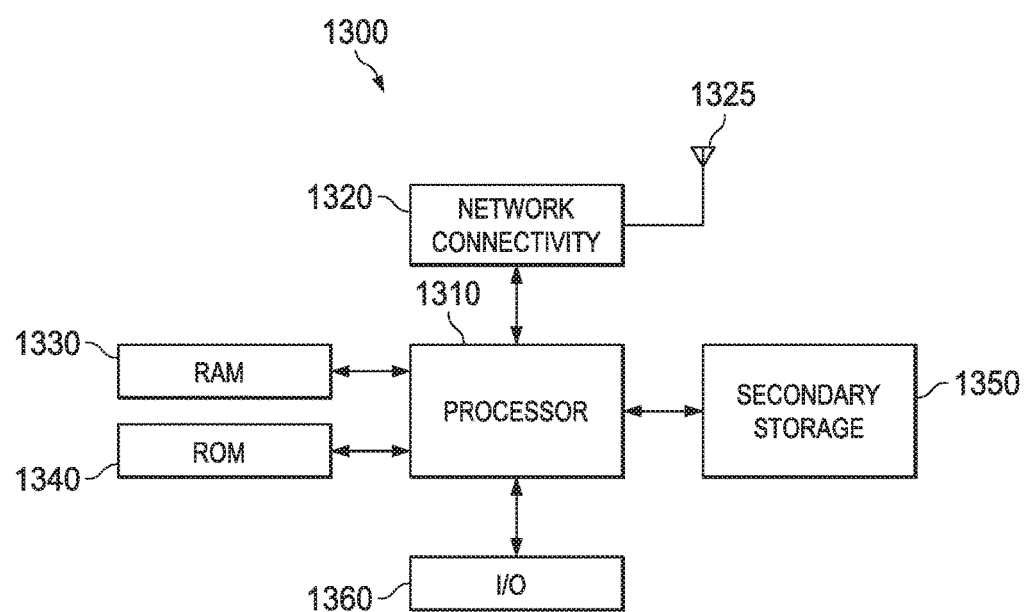
FIG. 5 is a schematic diagram of a general-purpose processor according to an embodiment of the disclosure.

Referring now to FIG. 5, a schematic diagram of a general-purpose processor (e.g., electronic controller or computer) system 1300 is shown according to an embodiment of the disclosure. In some embodiments, processing system 1300 may be system controller 106, outdoor controller 126, and/or controller 202 and be suitable for implementing one or more embodiments disclosed herein. In addition to the processor 1310 (which may be referred to as a central processor unit or CPU), the system 1300 may comprise network connectivity devices 1320, random-access memory (RAM) 1330, read-only memory (ROM) 1340, secondary storage 1350, and input/output (I/O) devices 1360. In some cases, some of these components may not be present or may be combined in various combinations with one another or with other components not shown. These components may be located in a single physical entity or in more than one physical entity. Any actions described herein as being taken by the processor 1310 might be taken by the processor 1310 alone or by the processor 1310 in conjunction with one or more components of the processor system 1300.

The processor 1310 generally executes algorithms, instructions, codes, computer programs, and/or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, processor system 1300 may comprise multiple processors 1310. Thus, while instructions may be discussed as being executed by a processor 1310, the instructions may be executed simultaneously, serially, or otherwise by one or multiple processors 1310. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, Bluetooth, Controller Area Network (CAN) and/or other well-known technologies, protocols and standards for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than access to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver component 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) system, comprising:
   an outdoor unit including an outdoor heat exchanger;
   a first temperature sensor configured to measure an outdoor ambient temperature at each of a first interval, a second interval, and a third interval following a defrost procedure;
   a second temperature sensor configured to measure a coil temperature of the outdoor heat exchanger at the each of the first time interval, the second time interval, and the third time interval following the defrost procedure; and
   a controller configured to determine if the second temperature sensor is unreliable based on the coil temperature relative to the outdoor ambient temperature at the each of the first interval, the second interval, and the third interval following the defrost procedure.

2. The HVAC system of claim 1, wherein the controller is configured to determine that the first temperature sensor is reliable in response to the coil temperature at the first time interval being greater than the ambient outdoor temperature at the first time interval, the coil temperature at the second time interval being less than the ambient outdoor temperature at the second time interval, and the coil temperature at the third time interval being less than the ambient outdoor temperature at the third time interval.

3. The HVAC system of claim 2, wherein the controller is configured to determine that the first temperature sensor is reliable in response to the ambient outdoor temperature at each of the first time interval, the second time interval, and the third time interval being within a specified tolerance.

4. The HVAC system of claim 3, wherein the controller is configured to determine that the first temperature sensor is unreliable in response to at least one of: (1) the coil temperature at the first time interval being less than the ambient outdoor temperature at the first time interval; (2) the coil temperature at the second time interval being greater than the ambient outdoor temperature at the second time interval; (3) the coil temperature at the third time interval being greater than the ambient outdoor temperature at the third time interval; and (4) the ambient outdoor temperature at each of the first time interval, the second time interval, and the third time interval being outside a specified tolerance.

5. The HVAC system of claim 1, wherein the controller is configured to determine that the second temperature sensor is reliable in response to the coil temperature at the second and the third interval being substantially constant and being less than the outdoor ambient temperature at the second and the third interval.

6. The HVAC system of claim 5, wherein the controller is configured to determine that the second temperature sensor is unreliable in response to the coil temperature at the second interval being outside of a specified tolerance to the coil temperature at the third interval.

7. The HVAC system of claim 1, wherein the first interval is within the first minute following a defrost procedure, wherein the second interval is when the coil temperature reaches an equilibrium temperature, and wherein the third interval is prior to frost accumulation on the outdoor heat exchanger that deteriorates performance of the outdoor heat exchanger.

8. The HVAC system of claim 1, wherein the first interval is within the first minute following a defrost procedure, wherein the second interval is at about 12 minutes following the defrost procedure, and wherein the third interval is at about 15 minutes following the defrost procedure.

9. The HVAC system of claim 4, wherein the controller is configured to implement a first limp along mode in response to determining that the first temperature sensor is unreliable.

10. The HVAC system of claim 9, wherein the first limp along mode comprises running a defrost procedure at about 60 minute intervals until the coil temperature reaches a specified defrost temperature.

11. The HVAC system of claim 6, wherein the controller is configured to implement a limp along mode in response to determining that the second temperature sensor is unreliable.

12. The HVAC system of claim 11, wherein the limp along mode comprises running about a 5 minute defrost procedure at about 60 minute intervals.

13. A method of validating temperature sensors in a heating, ventilation, and/or air conditioning (HVAC) system, comprising:
measuring an ambient outdoor temperature with a first temperature sensor and a refrigeration coil temperature with a second temperature sensor at each of a first interval, a second interval, and a third interval following a defrost procedure; and
determining if the second sensor is unreliable based on the coil temperature relative to the outdoor ambient temperature at the each of the first interval, the second interval, and the third interval.

14. The method of claim 13, further comprising:
comparing the ambient outdoor temperature to the coil temperature at each of the first time interval, the second time interval, and the third time interval.

15. The method of claim 14, further comprising:
determining that the first temperature sensor is unreliable in response to at least one of: (1) the coil temperature at the first time interval being less than the ambient outdoor temperature at the first time interval; (2) the coil temperature at the second time interval being greater than the ambient outdoor temperature at the second time interval; (3) the coil temperature at the third time interval being greater than the ambient outdoor temperature at the third time interval; and (4) the ambient outdoor temperature at each of the first time interval, the second time interval, and the third time interval being outside a specified tolerance.

16. The method of claim 13, further comprising:
comparing the coil temperature at the second interval to the coil temperature at the third interval.

17. The method of claim 16, further comprising:
determining that the second temperature sensor is unreliable in response to the coil temperature at the second interval being outside of a specified tolerance to the coil temperature at the third interval.

18. The method of claim 13, wherein the first interval is within the first minute following a defrost procedure, wherein the second interval is at about 12 minutes following the defrost procedure, and wherein the third interval is at about 15 minutes following the defrost procedure.

19. The method of claim 13, further comprising:
implementing a limp along mode in response to determining that either of the first temperature sensor and the second temperature sensor are unreliable.

20. A method of temperature sensor testing in a heating, ventilation, and/or air conditioning (HVAC) system, comprising:
sensing a refrigeration coil temperature with a first temperature sensor and an ambient outdoor temperature with a second temperature sensor at a plurality of time intervals following a defrost procedure of the HVAC system, each of the plurality of intervals being different from one another; and
determining if the first sensor is unreliable based on the coil temperature relative to the outdoor ambient temperature at the each of the plurality of time intervals.

* * * * *